METHOD OF IMPROVING DEFORMABILITY OF CELLULAR BODIES

Filed March 11, 1963

```
APPLYING SWELLING AGENT TO
CLOSED-CELL FULLY EXPANDED HARD
AND BRITTLE CELLULAR BODY CONSISTING
OF POLYVINYL CHLORIDE AND HARDENED
SYNTHETIC PLASTIC MATERIAL SUCH AS
POLYURETHANE AND PHENOLFORMALDEHYDE
RESINS
```

```
ALLOWING SWELLING AGENT TO DIFFUSE
INTO CELLULAR BODY TO BE SUBSTANTIALLY
EVENLY DISTRIBUTED THERETO
```

```
DRYING CELLULAR BODY TO REMOVE
MAJOR PORTION OF SWELLING AGENT
THEREFROM RETAINING ONLY AN AMOUNT
OF SWELLING AGENT EQUAL TO 2-5% OF
WEIGHT OF CELLULAR BODY, THEREBY
MAKING CELLULAR BODY DEFORMABLE
```

INVENTOR
Walter Pehn
BY
Michael J. Striker
ATTORNEY

3,192,300
METHOD OF IMPROVING DEFORMABILITY OF CELLULAR BODIES
Walter Pehn, Traunkirchen (Traunsee), Austria, assignor to Lonza Ltd., Basel, Switzerland, a corporation of Switzerland
Filed Mar. 11, 1963, Ser. No. 264,083
Claims priority, application Switzerland, Mar. 14, 1962, 3,037/62
10 Claims. (Cl. 264—340)

The present invention relates to a method of improving the deformabiity of cellular bodies, and particularly, the present invention is concerned with improving the deformability of cellular bodies consisting essentially of polyvinylchloride having incorporated therein a relatively brittle, hardened synthetic material.

Cellular bodies of polyvinylchloride which contains hardened synthetic materials such as polyurethane or phenol-formaldehyde resins are known per se and are hard and brittle. It would be desirable to use sheets, plates, strips or webs (which hereinbelow will be referred to as "sheets") of such material for instance in the production of boat shells or other shell-type bodies which are formed as sandwich structures of superposed layers of suitable materials, including a layer or layers of cellular plastic material. However, in view of the hardness and brittleness of cellular sheets consisting of polyvinylchloride which has a hardened resin such as polyurethane or the like distributed therethrough, only limited use can be made of the same in cases such as those described above in which bending of the sheet material of the sandwich structure is required. Due to the brittleness of the material at ambient temperature, not only deformation of the sheets but also the fitting of the various cellular sheets or plates which are to form the core or inner layer of the shell sandwhich structure is made extremely difficult so that even upon careful operation considerable losses due to breaking of the cellular plates usually cannot be avoided.

It is therefore an object of the present invention to overcome the disadvantages connected with the use of cellular sheets consisting of hardened synthetic resins-containing polyvinylchloride in the production of shell-type structures, particularly sandwich structures.

It is a further object of the present invention to provide a method which will improve the deformability and resiliency of cellular bodies, particularly sheets consisting of hardened synthetic material-containing polyvinylchloride, which method can be carried out in a simple and economical manner.

Other objects and advantages of the present invention will become apparent from a further reading of the description and of the appended claims.

With the above and other objects in view, the present invention contemplates a method of improving the deformability of a cellular body consisting essentially of polyvinylchloride containing a hardened synthetic plastic material, comprising the step of applying to at least the major portion of the surface of the body is solvent for polyvinylchloride, allowing the solvent to diffuse into the interior of the body so as to be substantially evenly distributed therethrough, and removing the major portion of the solvent from the body. The drawing is a flow sheet illustrating the steps of the claimed process.

According to a preferred manner of carrying out the method of the present invention, the same comprises the steps of applying a solvent for polyvinylchloride selected from the group consisting of acetone, methylethylketone, trichloroethylene, carbontetrachloride, methanol and ethanol to the opposite faces of a sheet of cellular, substantially closed cell, synthetic plastic material consisting essentially of polyvinylchloride having distributed therethrough a hardened synthetic plastic material selected from the group consisting of polyurethane and phenolformaldehyde resins in such a manner as to substantially evenly distribute the solvent through the cellular sheet, and removing the major portion of the solvent from the sheet, a minor portion of the solvent equal to between about 2 and 5% of the weight of the plastic material of the sheet being retained therein, whereby the deformability of the cellular sheet is improved.

Thus, the present invention is concerned with a method for improving the deformability of cellular sheets, particularly close-cell cellular sheets formed of polyvinylchloride in which a brittle hardened synthetic material has been incorporated. This is accomplished by subjecting the brittle cellular body such as a sheet or the like to the influence of volatile solvents or swelling agents for polyvinylchloride and by allowing such solvents or swelling agents to diffuse throughout the cellular body so as to be substantially evenly distributed therethrough. Thereafter, the major portion of the thus diffused volatile solvent or swelling agent is removed and only a relatively minor portion thereof, preferably amounting to between 2 and 5% of the weight of the cellular body is retained within the same.

The term "solvent" will be used throughout the present specification and claims as encompassing not only solvents in which polyvinylchloride is soluble but also swelling agents which are capable of causing swelling of polyvinylchloride.

Such solvents and swelling agents which, according to the present invention, may be applied to the cellular body, and the major portion thereof will be subsequently removed from the cellular body, include ketones such as acetone and methylethylketone, chlorinated hydrocarbons such as trichloroethylene, carbontetrachloride, alcohols, particularly alcohols of low molecular weight such as methanol and ethanol, or monomeric vinyl compounds such as styrene. These solvents or swelling agents may be used singly or a mixture of several such compounds may be applied to the cellular body of hardened synthetic resin-containing polyvinylchloride.

The solvent or the like may be applied to the cellular body in various manners. It is for instance possible to apply the solvent to the cellular sheet by immersing the sheet for a short period of time in the solvent or swelling agent, for instance at ambient or slightly elevated temperature. Upon removal of the immersed sheet from the solvent bath, solvent (or sweling agent which is to be encompassed in the term "solvent") will be retained on the surface of the cellular sheet or the like. Excess solvent will be permitted to drop off the sheet. Thereafter, the thus solvent-wetted cellular body is enveloped, for instance in a polyethylene foil so as to substantially prevent evaporation of the solvent adhering to the cellular body. The thus enveloped cellular sheet is then alowed to rest until the solvent thereon will have diffused throughout the cellular sheet and will be substantially evenly distributed therethrough. After completion of this diffusion process, the cellular body will be in a considerably softened condition. In order to transform the thus strongly softened cellular body into the desired hard but deformable state, it is then necessary to remove a major portion of the diffused volatile solvent, preferably by evaporation at ambient temperature and, if desired, under reduced pressure. Such removal of the diffused solvent preferably is carried out to such an extent that an amount of solvent equal to between about 2 and 5% of the initial weight of the cellular body will be retained within the same.

It is also possible to apply the solvent to the cellular body by subjecting the cellular body to contact with vaporized solvent, or to spray the cellular body, for instance by means of a spray gun, with the respective solvent or swelling agent.

The quantity of solvent which will adhere to the surface of the cellular body generally will suffice for a sufficient softening of plates, sheets or the like having a thickness of up to 10–50 mm., of course, after the thus applied solvent has been allowed to diffuse throughout the sheet.

In order to obtain even diffusion of the solvent throughout the ceullular sheet, it is desirable to initially have an even distribution of solvent on the surface of the sheet.

Experiments on an industrial scale have shown that even distribution of the solvent throughout cellular plates of the type described will require between about 25 and 30 minutes for plates having a thickness of about 10 mm. and between 60 and 90 minutes for plates having a thickness of 50 mm., when diffusion is carried out at ambient temperature. The diffusion process, i.e. the even distribution of the solvent throughout the cellular body can be accelerated by heating, however, the temperature must be maintained below the point at which the cell structure of the cellular body would be destroyed or unfavorably affected.

The method of the present invention makes it possible to utilize the thus described initially brittle cellular materials for producing curved sandwich bodies, for instance consisting of two opposite outer layers of glass fiber-reinforced polyester resin and an intermediate or core layer consisting of a closed cell cellular hardened resin-containing polyvinylchloride sheet or the like. The present invention has found particularly useful application in the production of boat shells, but is also applicable for producing other curved sandwich bodies, for instance for refrigerator doors or auto body parts.

Surprisingly, it was found that the cellular sheet material treated according to the present invention will maintain its deformability over prolonged periods of time, up to several months, so that the cellular sheets treated according to the present invention may be stored prior to further processing for prolonged periods of time. It seems that the residual portion of the solvent which, as pointed out above, preferably will amount to between about 2 and 5% of the weight of the cellular body will be retained in the cellular body over such prolonged periods of time without substantial evaporation.

The following examples are given as illustrative only without, however, limiting the invention to the specific details of the examples.

EXAMPLE 1

The two opposite surfaces of a closed-cell cellular plate consisting of brittle polyvinyl chloride made from a polyvinyl chloride/isocyanate mixture of 80:20 and having dimensions of 1000 x 500 x 10 mm. were successively placed on the surface of a bath of acetone maintained at a temperature of 25° C. Complete wetting of each surface of the plate required contact with the acetone bath for 30 seconds.

Thereafter, excess acetone was removed from the surfaces of the plate by shaking and the plate was then enveloped into a polyethylene foil and allowed to rest tightly enveloped in the foil for 25 minutes at ambient temperature. Thereafter, the plate was removed from the enveloping polyethylene foil and placed between two bar grates and allowed to dry for 3 days by being thus exposed to the surrounding atmosphere.

If the slow evaporation of excess solvent from the cellular sheet is carried out under atmospheric pressure but at a somewhat elevated temperature, namely 40° C., the same condition, which as described above is achieved within 3 days will be achieved within 8 hours.

After thus completing the drying of the plate, i.e., the removal of the solvent with the exception of a small residual portion thereof, it will be found that the initially brittle and easily breakable plates have become resilient and deformable but nevertheless sufficiently hard for being incorporated into sandwich structures of high bending strength.

Additional plates which were treated as described hereinabove and which were initially produced by conventional chemical blowing process from hardened synthetic resin-containing polyvinylchloride, so as to have a closed-cell cellular structure, when tested after storage for several months exposed to the atmosphere did not show any reduction in resiliency and deformability.

The degree of deformability was measured in an apparatus in which the cellular plate was bent at various angles by being passed over rollers. The plates were slowly bent to a greater degree until crack formation on the surface of the plate became apparent. The speed of bending in all tests equalled about 2° per second.

Closed-cell cellular plates of polyurethane-containing polyvinylchloride and of varying thickness were treated as described herein and their deformability was then determined by bending. The deformability was tested about 3 weeks after solvent treatment of the plates. It was found that due to the solvent treatment, the thickness of the plates was reduced by between about 1 and 2 mm. and consequently the weight of the plates per unit of volume after treatment was greater than before treatment.

The results of these tests are summarized in the following Table I.

*Table I*

| Prior to Solvent Treatment | | | After Solvent Treatment | | |
|---|---|---|---|---|---|
| Weight/Volume, g./cm.$^3$ | Thickness, mm. | Bending Angle, degrees | Weight/Volume, g./c.$^3$ | Thickness, mm. | Bending Angle, degrees |
| 0.081 | 8.1 | 17 | 0.163 | 6.8 | 36 |
| 0.081 | 8.9 | 16 | 0.143 | 7.6 | 33 |
| 0.077 | 12.0 | 25 | 0.109 | 9.9 | 70 |
| 0.069 | 12.3 | 27 | 0.112 | 9.2 | 61 |

It can be seen from Table I that the bending angle, i.e. the angle at which crack formations started was about between 100 and 180% greater in the treated plates than in the untreated plates. This shows to what high degree brittleness of the plates at room temperature was reduced by treatment according to the present invention and such reduction in brittleness is equivalent to the increase in deformability.

EXAMPLE 2

As described in Example 1, a closed-cell cellular plate of brittle polyurethane-containing polyvinylchloride was treated with acetone. Strips of 40 mm. width, 10 mm. thickness and 200 mm. length were cut off the treated and untreated material and were tested for weight per volume, bending moment and bending resistance. The weight per unit of volume was determined in conventional manner. Bending moment and bending resistance were tested by inserting the test strips into the testing apparatus so that the distance between the two supported portions of the test strips was 150 mm.

4 separate tests for the treated and untreated cellular plates gave the following average results:

*Table II*

| | Weight/Volume, g./cm.$^2$ | Max. Bending Moment, cm. kg. | Bending Resistance, cm.$^2$/kg. |
|---|---|---|---|
| Untreated | 0.024 | 0.36 | 11.8 |
| Treated | 0.070 | 0.60 | 5.8 |

The results shown in Table II indicate that the weight per volume of the treated cellular material is greater than that of the untreated material. The brittleness can be defined by the values for maximum bending moment and bending resistance. The more brittle cellular plates have a smaller maximum bending moment and frequently higher bending resistance, while the treated cellular plates can be more easily bent, however, will not break as easily as the untreated cellular sheet. On the other hand, the brittle sheets break substantially as soon as bending of the same starts.

The results of the tests shown in Table II clearly indicate that treatment according to the present invention will reduce the brittleness and increase the tenacity, deformability and resiliency of the cellular sheet.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of making a closed cell, hard and brittle cellular body deformable, said body consisting essentially of polyvinylchloride containing a hardened synthetic plastic material, comprising the step of applying to at least the major portion of the surface of said body a swelling agent for polyvinylchloride at a temperature sufficiently low so as not to affect the cell structure of said cellular body; allowing said swelling agent to diffuse into the interior of said body so as to be substantially evenly distributed therethrough; and removing the major portion of said swelling agent from said body.

2. A method of making a hard and brittle cellular body deformable, comprising the steps of applying at a temperature sufficiently low so as substantially not to affect the cell structure of said cellular body a swelling agent for polyvinylchloride to the opposite faces of a sheet of cellular, substantially closed cell, synthetic plastic material consisting essentially of polyvinylchloride having distributed therethrough a hardened synthetic plastic material, in such a manner as to substantially evenly distribute said swelling agent through said cellular sheet; and removing the major portion of said swelling agent from said sheet, a minor portion of said swelling agent being retained therein, whereby said cellular sheet is made deformable.

3. A method of making a hard and brittle cellular body deformable, comprising the steps of applying at a temperature sufficiently low so as substantially not to affect the cell structure of said cellular body a swelling agent for polyvinylchloride to the opposite faces of a sheet of cellular, substantially closed cell, synthetic plastic material consisting essentially of polyvinylchloride having distributed therethrough a hardened synthetic plastic material, in such a manner as to substantially evenly distribute said swelling agent through said cellular sheet; and removing the major portion of said swelling agent from said sheet, a minor portion of said swelling agent equal to between about 2 and 5% of the weight of said plastic material of said sheet being retained therein, whereby said cellular sheet is made deformable.

4. A method of making a hard and brittle cellular body deformable, comprising the steps of spraying at a temperature sufficiently low so as substantially not to affect the cell structure of said cellular body a swelling agent for polyvinylchloride onto the opposite faces of a sheet of cellular, substantially closed cell, synthetic plastic material consisting essentially of polyvinylchloride having distributed therethrough a hardened synthetic plastic material, in such a manner as to substantially evenly distribute said swelling agent through said cellular sheet; and removing the major portion of said swelling agent from said sheet, a minor portion of said swelling agent equal to between about 2% and 5% of the weight of said sheet being retained therein, whereby said cellular sheet is made deformable.

5. A method of making a hard and brittle cellular body deformable, comprising the steps of immersing at a temperature sufficiently low so as substantially not to affect the cell structure of said cellular body in a swelling agent for polyvinylchloride a sheet of cellular, substantially closed cell, synthetic plastic material consisting essentially of polyvinylchloride having distributed therethrough a hardened synthetic plastic material; withdrawing said sheet from said swelling agent and allowing the withdrawn sheet to stand so as to substantially evenly distribute said swelling agent through said cellular sheet; and removing the major portion of said swelling agent from said sheet, a minor portion of said swelling agent equal to between about 2% and 5% of the weight of said sheet being retained therein, whereby said cellular sheet is made deformable.

6. A method of making a hard and brittle cellular body deformable, comprising the steps of spraying at a temperature sufficiently low so as substantially not to affect the cell structure of said cellular body a vaporized swelling agent for polyvinylchloride onto the opposite faces of a sheet of cellular, substantially closed cell, synthetic plastic material consisting essentially of polyvinylchloride having distributed therethrough a hardened synthetic plastic material, in such a manner as to substantially evenly distribute said swelling agent through said cellular sheet; and removing the major portion of said swelling agent from said sheet, a minor portion of said swelling agent equal to between about 2% and 5% of the weight of said sheet being retained therein, whereby said cellular sheet is made deformable.

7. A method of making a hard and brittle cellular body deformable, comprising the steps of applying at a temperature sufficiently low so as substantially not to affect the cell structure of said cellular body a swelling agent for polyvinylchloride to the opposite faces of a sheet of cellular, substantially closed cell, synthetic plastic material consisting essentially of polyvinylchloride having distributed therethrough a hardened synthetic plastic material; enveloping said sheet with said swelling agent applied thereto so as to substantially prevent evaporation of said swelling agent while said swelling agent diffuses through said sheet so as to substantially evenly distribute said swelling agent through said cellular sheet; and removing the major portion of said swelling agent from said sheet, a minor portion of said swelling agent equal to between about 2% and 5% of the weight of said sheet being retained therein, whereby said cellular sheet is made deformable.

8. A method of making a hard and brittle cellular body deformable, comprising the steps of applying at a temperature sufficiently low so as substantially not to affect the cell structure of said cellular body a swelling agent for polyvinylchloride to the opposite faces of a sheet of cellular, substantially closed cell, synthetic plastic material consisting essentially of polyvinylchloride having distributed therethrough a hardened synthetic plastic material selected from the group consisting of polyurethane and phenol-formaldehyde resins, in such a manner as to substantially evenly distribute said swelling agent through said cellular sheet; and removing the major portion of said swelling agent from said sheet, a minor portion of said swelling agent equal to between about 2% and 5% of the weight of said sheet equal to between about 2 and 5% of the weight of said plastic material of said sheet being retained therein, whereby said cellular sheet is made deformable.

9. A method of making a hard and brittle cellular body deformable, comprising the steps of applying at a temperature sufficiently low so as substantially not to affect the cell structure of said cellular body a swelling agent for polyvinylchloride selected from the group consisting of acetone, methylethylketone, trichloroethylene, carbontetrachloride, methanol and ethanol to the opposite faces of a sheet of cellular, substantially closed cell, synthetic plastic material consisting essentially of polyvinylchloride having distributed therethrough a hardened synthetic plastic material, in such a manner as to substantially evenly distribute said swelling agent through said cellular sheet; and removing the major portion of said swelling agent from said sheet, a minor portion of said swelling agent equal to between about 2 and 5% of the weight of said plastic material of said sheet being retained therein, whereby said cellular sheet is made deformable.

10. A method of making a hard and brittle cellular body deformable, comprising the steps of applying at a temperature sufficiently low so as substantially not to affect the cell structure of said cellular body a swelling agent for polyvinylchloride selected from the group consisting of acetone, methylethylketone, trichloroethylene, carbontetrachloride, methanol and ethanol to the opposite faces of a sheet of cellular, substantially closed cell, synthetic plastic material consisting essentially of polyvinylchloride having distributed therethrough a hardened synthetic plastic material selected from the group consisting of polyurethane and phenol-formaldehyde resins, in such a manner as to substantially evenly distribute said swelling agent through said cellular sheet; and removing at a temperature of or to about 40° C. the major portion of said swelling agent from said sheet, a minor portion of said swelling agent equal to between about 2 and 5% of the weight of said plastic material of said sheet being retained therein, whereby said cellular sheet is made deformable.

References Cited by the Examiner
UNITED STATES PATENTS

| | | | |
|---|---|---|---|
| 2,795,008 | 6/57 | Lindermann et al. | 264—54 |
| 2,898,312 | 8/59 | Szukiewicz et al. | 260—2.5 |
| 2,926,389 | 3/60 | Garlington | 264—54 |
| 2,961,710 | 11/60 | Stark | 264—54 |
| 3,025,200 | 3/62 | Powers | 264—54 |

ALEXANDER H. BRODMERKEL, *Primary Examiner.*